(12) United States Patent
Kawamura

(10) Patent No.: US 11,981,263 B2
(45) Date of Patent: May 14, 2024

(54) VEHICLE MIRROR SURFACE ANGLE ADJUSTING DEVICE, AND VEHICLE MIRROR DEVICE

(71) Applicant: Misato Industries Co., Ltd., Fujioka (JP)

(72) Inventor: Atsushi Kawamura, Isehara (JP)

(73) Assignee: Misato Industries Co., Ltd., Fujioka (JP)

( * ) Notice: Subject to any disclaimer, the term of this patent is extended or adjusted under 35 U.S.C. 154(b) by 547 days.

(21) Appl. No.: 17/253,350

(22) PCT Filed: Jun. 20, 2019

(86) PCT No.: PCT/JP2019/024522
§ 371 (c)(1),
(2) Date: Dec. 17, 2020

(87) PCT Pub. No.: WO2019/244983
PCT Pub. Date: Dec. 26, 2019

(65) Prior Publication Data
US 2021/0261052 A1 Aug. 26, 2021

(30) Foreign Application Priority Data
Jun. 21, 2018 (JP) ................................. 2018-117766

(51) Int. Cl.
*B60R 1/072* (2006.01)
(52) U.S. Cl.
CPC ..................................... *B60R 1/072* (2013.01)
(58) Field of Classification Search
CPC .................................. B60R 1/07; B60R 1/072
(Continued)

(56) References Cited

U.S. PATENT DOCUMENTS

| 4,202,603 A | * | 5/1980 | Miyauchi | ................ B60R 1/072 359/873 |
| 2008/0043354 A1 | * | 2/2008 | Fukai | ...................... B60R 1/072 359/877 |

(Continued)

FOREIGN PATENT DOCUMENTS

| EP | 1 798 105 A1 | 6/2007 |
| JP | 2013-163498 A | 8/2013 |

(Continued)

OTHER PUBLICATIONS

Extended European Search Report dated Oct. 29, 2021 in corresponding European Patent Application No. 19821943.8, 6 pages.

(Continued)

*Primary Examiner* — Balram T Parbadia
*Assistant Examiner* — Rahman Abdur
(74) *Attorney, Agent, or Firm* — Oblon, McClelland, Maier & Neustadt, L.L.P.

(57) ABSTRACT

The present invention includes a stationary member, a movable member, a holding member, and a driving member. The stationary member has a stationary-side spherical surface. The movable member has a movable-side spherical surface. The stationary-side spherical surface and the movable-side spherical surface together forms a gap. The stationary-side spherical surface and the movable-side spherical surface are interposed with a sealant, which seals the gap. Consequently, the present invention allows smooth adjustment of an angle of a mirror surface, and prevention of water penetrating inside.

5 Claims, 6 Drawing Sheets

(58) Field of Classification Search
USPC .......................................... 359/872, 873, 877
See application file for complete search history.

(56) References Cited

U.S. PATENT DOCUMENTS

2008/0310040 A1    12/2008  Suzuki et al.
2017/0282802 A1*   10/2017  Sugimura ............... B60R 1/072

FOREIGN PATENT DOCUMENTS

JP      2017-178223 A     10/2017
WO   WO 2006/040800 A1    4/2006

OTHER PUBLICATIONS

International Search Report dated Sep. 10, 2019 in PCT/JP2019/024522 filed on Jun. 20, 2019, 1 page.
Chinese Office Action issued in Chinese Patent Application No. 201980041495.3 dated May 31, 2023 (w/ English Translation).
Japanese Office Action dated May 10, 2022 issued in Japanese Patent Application No. 2018-117766 filed on Jun. 21, 2018, with Machine-generated English Translation, total 10 pages.

* cited by examiner

VEHICLE MIRROR SURFACE ANGLE ADJUSTING DEVICE, AND VEHICLE MIRROR DEVICE

TECHNICAL FIELD

The present disclosure relates to a vehicle mirror surface angle adjusting device and a vehicle mirror device.

BACKGROUND ART

Vehicle mirror devices equipped with a vehicle mirror surface angle adjusting device are exemplified by that shown in PTL 1. The vehicle mirror device in PTL 1 has a mirror surface angle adjusting device in which a mirror surface angle is adjusted by sliding a sliding part of a mirror holder onto a projecting part of a case, along with rotating the mirror holder.

CITATION LIST

Patent Literature

PTL 1: Japanese Unexamined Patent Application Publication No. 2013-163498

SUMMARY OF THE INVENTION

Problems to be Solved by the Invention

However, the vehicle mirror device in PTL 1 has mutual contact (pressure contact) between a sliding site of the sliding part of the mirror holder and a contact surface (a sliding part) of the projecting part of the case. This may result in the vehicle mirror device in PTL 1 having greater contact force between the sliding site and the contact surface under low-temperature environment. In particular, the contact force described above may become greater depending on the dimensional tolerance of a member. Thus, in the vehicle mirror device in PTL 1, the sliding site of the sliding part of the mirror holder may be incapable of sliding smoothly relative to the contact surface of the projecting part of the case, i.e., may be incapable of adjusting smoothly an angle of the mirror surface.

As such, the vehicle mirror device in Patent Literature 1 may be intended to include a gap between the sliding site and the contact surface. However, simply providing the gap between the sliding site and the contact surface can allow water to penetrate from the gap into the mirror surface angle adjusting device.

Accordingly, the present disclosure has an object to provide a vehicle mirror surface angle adjusting device and a vehicle mirror device that allows smooth adjustment of an angle of a mirror surface, and also prevention of water penetrating inside.

Means for Solving the Problem

According to an aspect of the present disclosure, in a vehicle mirror surface angle adjusting device that adjusts an angle of a mirror surface in a vehicle, the vehicle mirror surface angle adjusting device includes a stationary member fixed to a mirror housing, a movable member to be attached with a mirror unit, a holding member holding the movable member onto the stationary member and rotatably centering a rotational center, and a driving member allowing the movable member to rotate relative to the stationary member along with centering the rotational center; the stationary member having a stationary-side spherical surface configured of a part of the spherical surface that centers the rotational center, the movable member having a movable-side spherical surface configured of a part of the spherical surface that centers the rotational center, a gap being formed between the stationary-side spherical surface and the movable-side spherical surface, and a sealant that seals the gap being interposed between the stationary-side spherical surface and the movable-side spherical surface.

Effect of the Invention

According to the disclosure, provided are a vehicle mirror surface angle adjusting device and a vehicle mirror device that allows smooth adjustment of an angle of a mirror surface, and also prevention of water penetrating inside.

BRIEF DESCRIPTION OF THE DRAWINGS

FIG. 3(A) is a partial enlarged longitudinal view at a site in a longitudinal groove part. FIG. 3(B) is a partial enlarged longitudinal sectional view at a site other than in the longitudinal groove part.

FIG. 4(A) is a partial enlarged longitudinal sectional view showing a status of the sealant applied to a circumferential groove part. FIG. 4(B) is a partial enlarged longitudinal sectional view showing a status of an angle of a mirror surface of 0° (in neutral). FIG. 4(C) is a partial enlarged longitudinal sectional view showing a status of an angle of the mirror surface being adjusted and of a movable member descending relative to a stationary member. FIG. 4(D) is a partial enlarged longitudinal sectional view showing a status of an angle of the mirror surface being adjusted, and of the movable member ascending relative to the stationary member.

MODE FOR CARRYING OUT THE INVENTION

In the specification, front, back, up, down, left, and right represent front, back, up, down, left, and right as the vehicle mirror device according to the invention is mounted on a vehicle.

Figure 1:
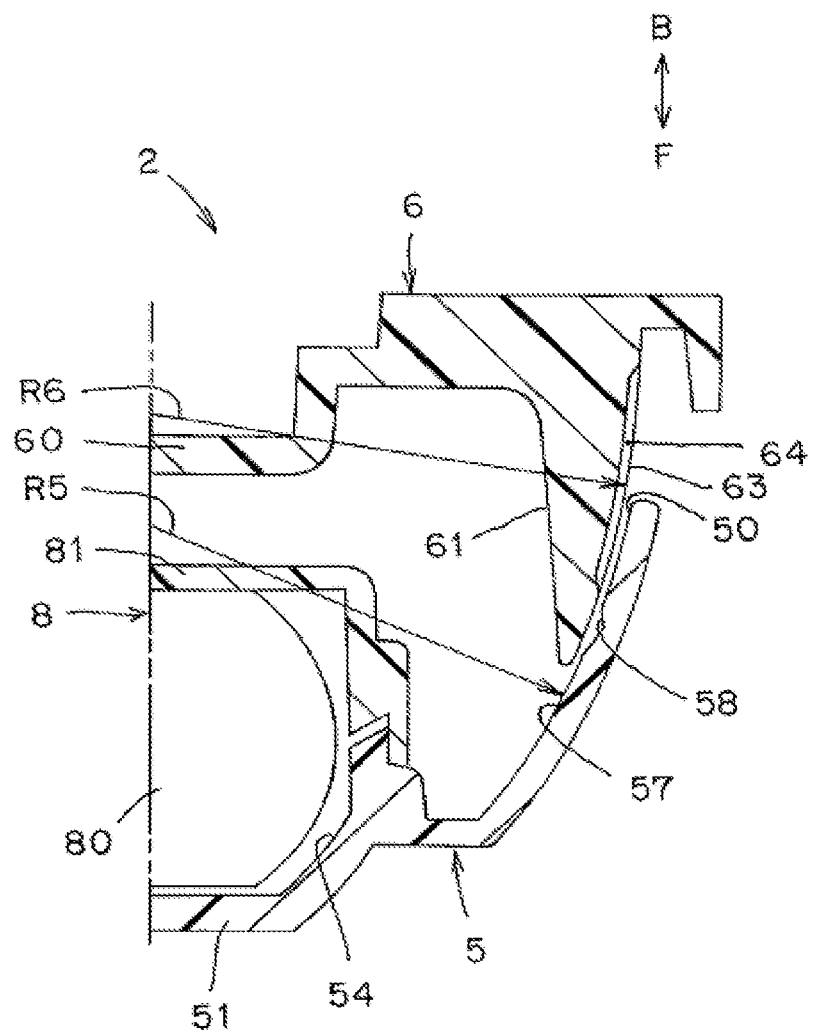
FIG. 1 is a partial enlarged longitudinal sectional view of the principal part showing an embodiment of the vehicle mirror surface angle adjusting device and the vehicle mirror device according to the invention (a partial enlarged sectional view of the part I in FIG. 2).
Figure 2:
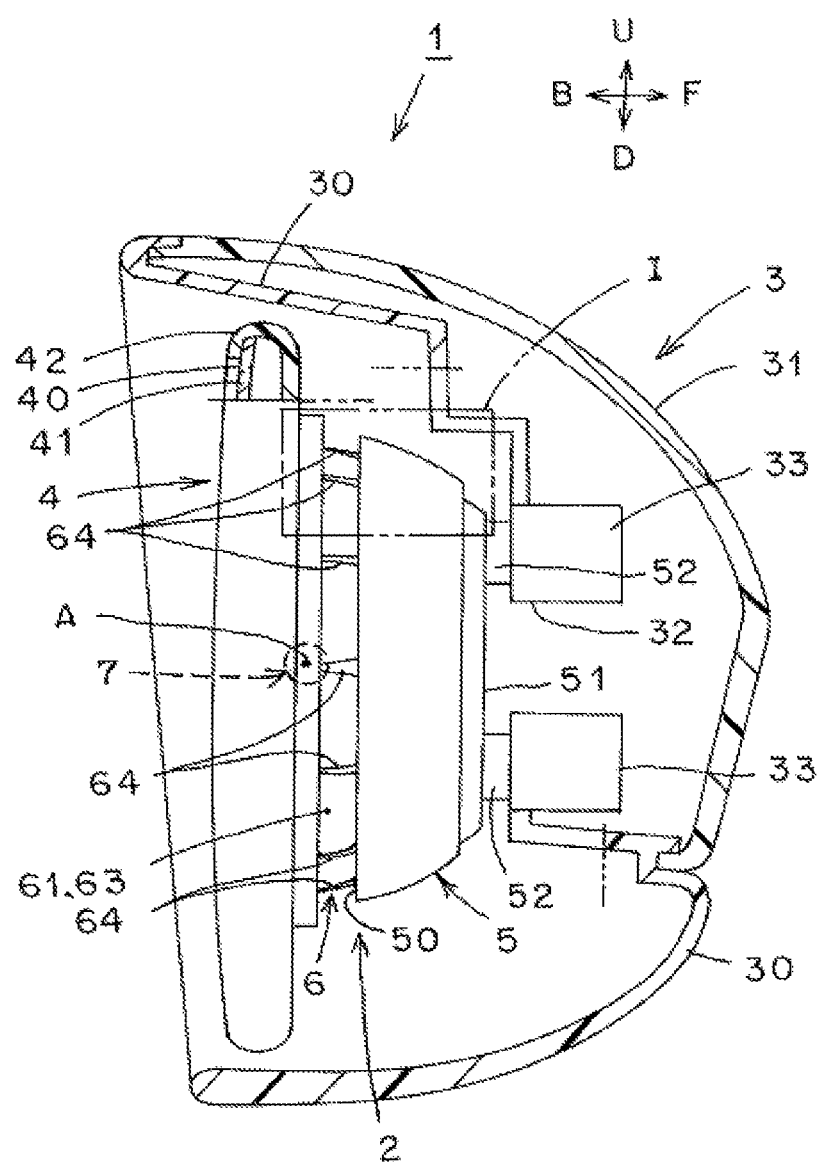
FIG. 2 is a partial cutaway side view showing a usage state.

In FIGS. 1 and 2, a sign of "F" represents "front", "B" represents "back", "U" represents up, and "D" represents "down". Additionally, the drawings are schematic views, and thus depict main members, omit depiction of members other than the main members, and omit some part of hatching. Furthermore, FIGS. 1 and 3 omit depiction of a sealant 9.

(Description for a Configuration of the Embodiment)

Hereinafter, description will be provided for a configuration of the vehicle mirror surface angle adjusting device and the vehicle mirror device according to the embodiment.

(Description for a Vehicle Mirror Device 1)

In the figures, a sign 1 denotes a vehicle mirror device (an automobile rearview mirror) according to the embodiment. The vehicle mirror device 1 in the example is attached inclinably outside a vehicle body (door) via a base (not depicted), a shaft (not depicted), and a storage unit (not depicted). The vehicle mirror device 1 includes a vehicle mirror surface angle adjusting device (a power unit) 2, a mirror housing 3, a mirror unit 4, and an angle detection storage unit (not depicted), as shown in FIGS. 1 and 2.

(Description for the Vehicle Mirror Surface Angle Adjusting Device 2)

The vehicle mirror surface angle adjusting device 2 includes a stationary member 5, a movable member 6, a holding member 7, a driving member 8, and a sealant 9, as shown in FIGS. 1 and 2.

(Description for the Stationary Member 5)

Figure 5:
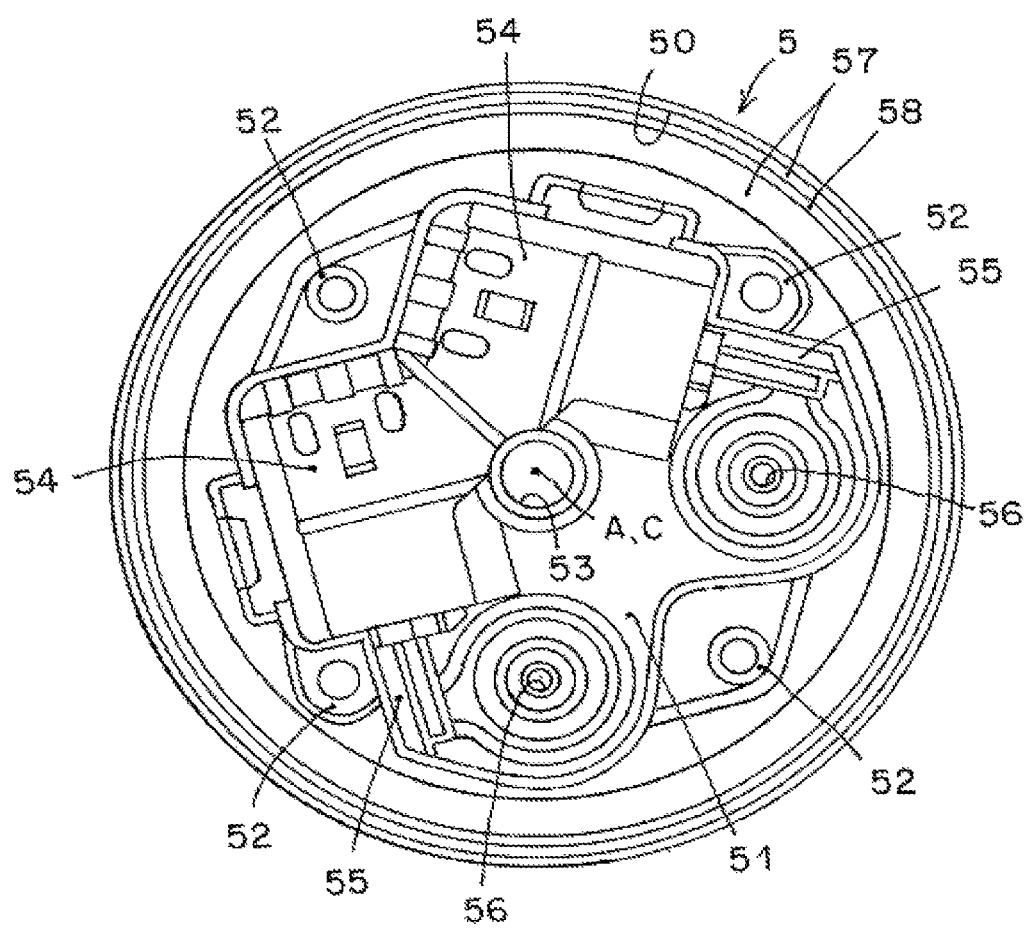
FIG. 5 is a front view showing a stationary member (a view from rear of the vehicle toward the front).

The stationary member 5 in the example is composed of a resin member. The stationary member 5 is configured of a substantially hemispherical case (container) as shown in FIGS. 1, 2, and 5. In other words, the stationary member 5 takes a mortar-like shape. The rear part of the stationary member 5 has a circular opening part 50, and the front part of the stationary member 5 has a circular closed part 51.

The outside face of the closed part 51 has a plurality of, four in the example, boss parts 52. A screw (not depicted) is screwed into the boss part 52 via the mirror housing 3, thereby securing the stationary member 5 to the mirror housing 3. Moreover, the center of the closed part 51 has one holding member storage part 53. Furthermore, the inside face of the closed part 51 has two motor storage parts 54, two power transmission mechanism storage parts 55, and two adjustable rod storage part 56, correspondingly.

The inside face of the side wall part of the stationary member 5 forms a stationary-side spherical surface 57 configured of a part of a spherical surface that centers a rotational center A. The stationary-side spherical surface 57 has a sealant pool part 58 to pool the sealant 9. The sealant pool part 58 is configured of a circumferential groove part disposed circumferentially centering a centerline C, which passes through the rotational center A and intersects (is perpendicular to, in the example) a mirror surface 40 described later. The circumferential groove part 58 in the example is disposed as a single continuous circumference.

(Description of the Movable Member 6)

Figure 6:
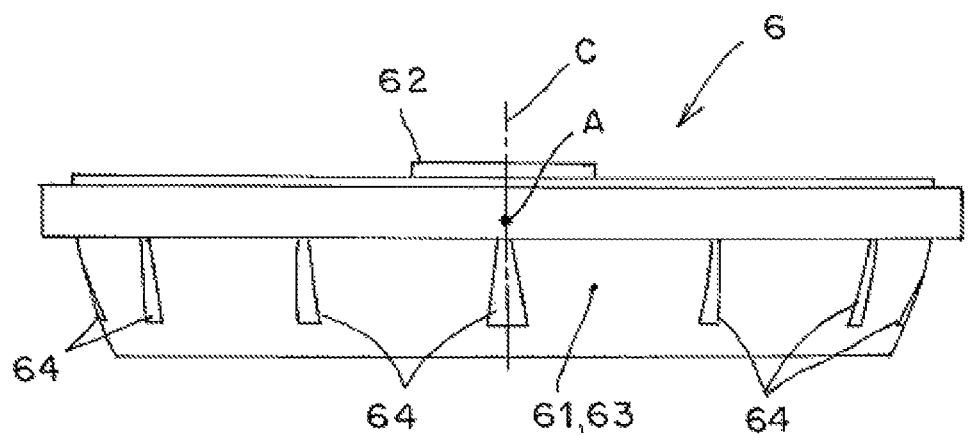
FIG. 6 is a side view showing a movable member.

The movable member 6 in the example is composed of a resin member. The movable member 6 is configured of an attachment part 60, which has a substantially disc shape, and a side wall part 61, which is a little smaller than the stationary member 5 and has a substantially hemisphere shape, as shown in FIGS. 1, 2, and 6. The side wall part 61 is disposed integrally on the whole peripheral of the attachment part 60.

The attachment part 60 includes a mirror unit attachment part (not depicted). The mirror unit 4 is attached to the mirror unit attachment part, thereby attaching the mirror unit 4 on the movable member 6. Moreover, the center of the attachment part 60 has a holding member attachment part 62. Furthermore, the attachment part 60 includes two adjustable rod attachment parts (not depicted).

The outside face of the side wall part 61 of the movable member 6 forms a movable-side spherical surface 63 configured of a part of a spherical surface centering the rotational center A. The movable-side spherical surface 63 has a radius R6 a little smaller than a radius R5 of the stationary-side spherical surface 57.

The movable-side spherical surface 63 has a sealant pool part 64 to pool the sealant 9. The sealant pool part 64 is configured of a longitudinal groove part disposed parallel to the centerline C, which passes through the rotational center A and intersects (is perpendicular to, in the example) the mirror surface 40 described later. The longitudinal groove part 64 in the example is disposed in a longitudinal direction (in a perpendicular direction), and twelve of such parts are placed circumferentially with equal spacing. In addition, the longitudinal groove part 64 has a shape with a width narrower toward the mirror surface 40.

(Description of the Circumferential Groove Part 58 and the Longitudinal Groove Part 64)

Figure 3:
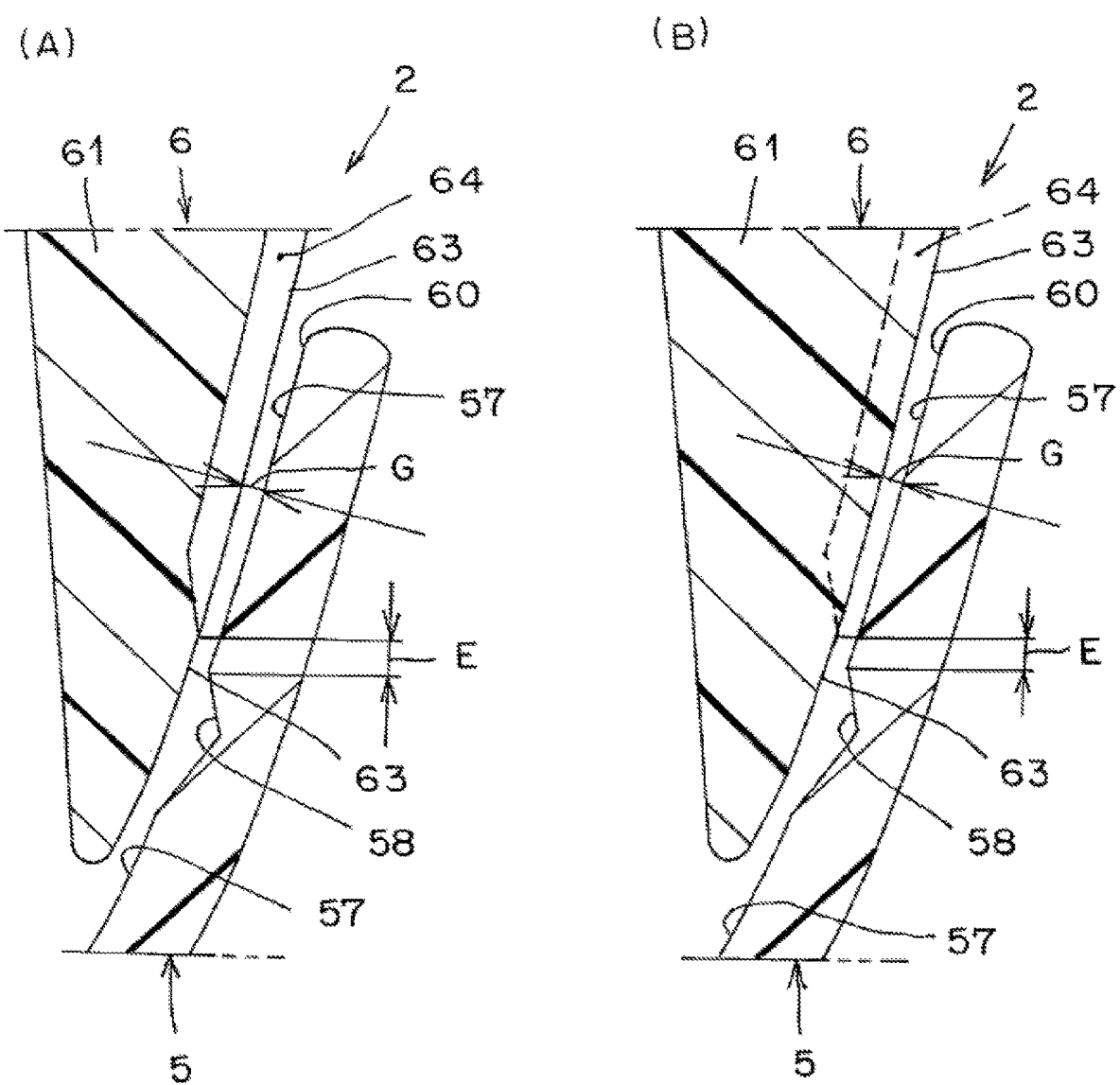
FIG. 3 is a partial enlarged longitudinal sectional view of the principal part.

The circumferential groove part 58 and the longitudinal groove part 64 have no mutual intersection when the mirror surface 40 is in neutral or in initial settings, as shown in FIG. 3. In other words, between the edge of the circumferential groove part 58 closer to the mirror surface 40 and the end of the longitudinal groove part 64 opposed to the mirror surface 40, a part (overlapping part, doubling part) E is present in which the stationary-side spherical surface 57 of the stationary member 5 and the movable-side spherical surface 63 in the movable member 6 encounter each other.

(Description of the Holding Member 7)

The holding member 7 is configured of a pivot mechanism (ball joint). The holding member 7 is stored in the holding member storage part 53 of the stationary member 5, and attached to the holding member attachment part 62 of the movable member 6. The holding member 7 holds the movable member 6 onto the stationary member 5 rotatably centering the rotational center A. The rotational center A is the rotational center of the holding member 7.

Moreover, as shown in FIG. 3, the holding member 7 provides a gap G formed between the stationary-side spherical surface 57 of the stationary member 5 and the movable-side spherical surface 63 of the movable member 6.

(Description of the Driving Member 8)

The driving member 8 has two motors 80, two pairs of power transmission mechanisms (not depicted), and two adjustable rods (not depicted). The two motors 80 are stored in the two motor storage parts 54 of the stationary member 5, and covered with a cover 81. The two pairs of power transmission mechanisms are stored in the two power transmission mechanism storage parts 55 of the stationary member 5. The two adjustable rods are stored in the two adjustable rod storage parts 56 in the stationary member 5, and attached to two adjustable rod attachment parts of the movable member 6.

The two motors 80 consist of a left-right motor and an up-down motor. Incidentally, the motor 80 shown in FIG. 1 is either the left-right motor or the up-down motor. The two pairs of power transmission mechanisms consist of a left-right power transmission mechanism and an up-down power transmission mechanism. The two adjustable rods consist of a left-right adjustable rod and an up-down adjustable rod. To the left-right motor, the left-right adjustable rod is linked via the left-right power transmission mechanism. In contrast, to the up-down motor, the up-down adjustable rod is linked via the up-down power transmission mechanism.

Once the left-right motor is driven, the left-right adjustable rod rotates via the left-right power transmission mechanism, and moves back and forth by screw feeding action. This causes the movable member 6 to rotate left and right about a vertical axis passing through the rotational center A (not depicted), relative to the stationary member 5. Furthermore, once the up-down motor is driven, the up-down adjustable rod rotates via the up-down power transmission mechanism, and moves back and forth by screw feeding action. This causes the movable member 6 to rotate up and down about a horizontal axis passing through the rotational center A (not depicted), relative to the stationary member 5.

(Description of the Sealant 9)

The sealant 9 is interposed between the stationary-side spherical surface 57 of the stationary member 5 and the movable-side spherical surface 63 of the movable member 6. The sealant 9 seals the gap G, which is formed between the stationary-side spherical surface 57 of the stationary member 5 and the movable-side spherical surface 63 of the movable member 6. The sealant 9 is grease in the example.

Figure 4:
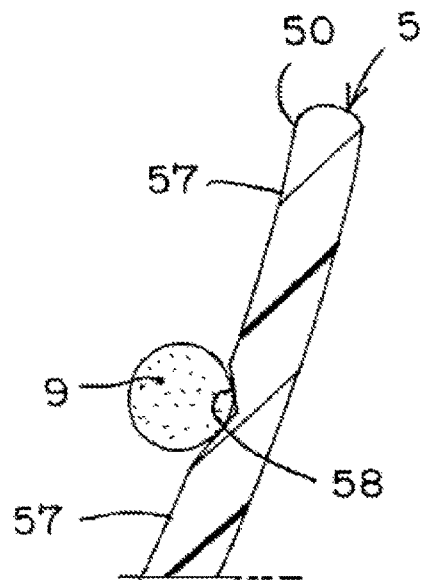
FIG. 4 is a partial enlarged longitudinal sectional view showing statuses of a sealant.
Figure 4:
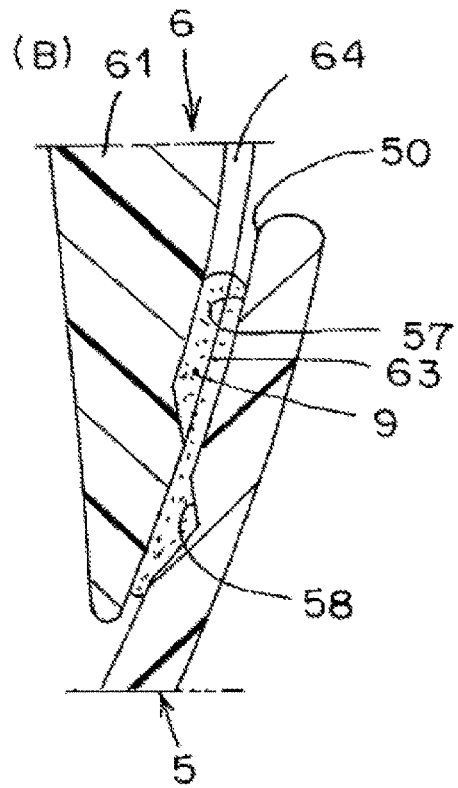
Figure 4:
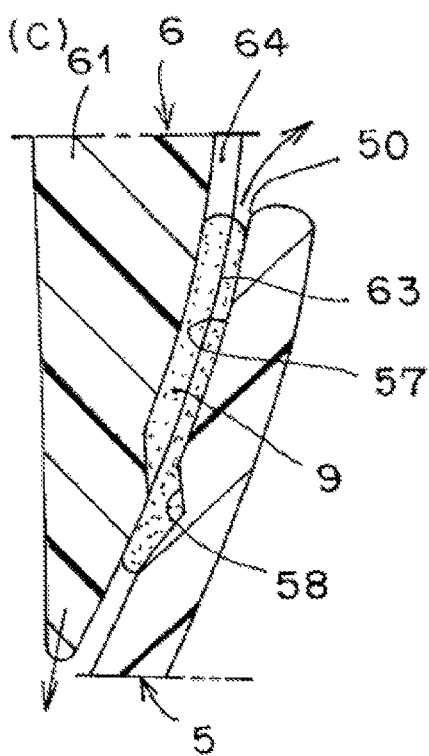
Figure 4:
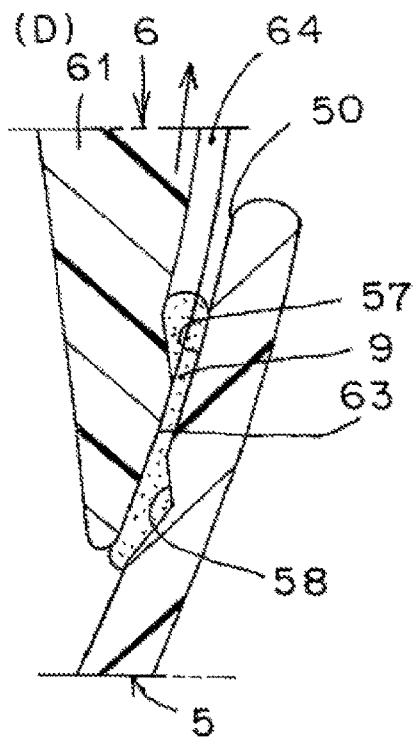

The sealant 9 is applied on the circumferential groove part 58 of the stationary member 5 before assembly with the movable member 6, and seamlessly over the entire circumference of the circumferential groove part 58, as shown in FIG. 4(A). Here, in application of the sealant 9 in an assembly process of the vehicle mirror surface angle adjusting device 2, the stationary member 5 is set on an assembly bench with the centerline C kept vertical. Thus, the circumferential groove part 58 is parallel to the assembly bench (perpendicular to the centerline C).

In addition, the sealant 9 is interposed in the gap G formed between the stationary-side spherical surface 57 of the stationary member 5 and the movable-side spherical surface 63 of the movable member 6 by assembling the movable member 6 with the stationary member 5, and seals the gap G, as shown in FIGS. 4(B), 4(C), and 4(D). The sealant 9 can prevent water (not depicted) from passing through the gap G and penetrating inside the vehicle mirror surface angle adjusting device 2.

In this regard, the circumferential groove part 58 of the stationary member 5 is disposed at a certain height with a prescribed dimension apart from the rim of the opening part 50 of the stationary member 5. The prescribed dimension is such dimension that the sealant 9 applied to the circumferential groove part 58 will not be squeezed out from the opening part 50 of the stationary member 5 in assembly of the stationary member 5 with the movable member 6.

(Description of the Mirror Housing 3)

The mirror housing 3 in the example is composed of a resin member. The mirror housing 3 includes a storage part 30 and a cover part 31, as shown in FIG. 2. The storage part 30 forms a hollow shape. The front of the storage part 30 (the rear side face in the vehicle) has opened. The back face of the storage part 30 (the front side face in the vehicle) has closed.

The back-face closed part has an opening part 32. The rim of the opening part 32 includes four fixture parts 33 corresponding to four of the boss parts 52 of the stationary member 5. To the fixture parts 33, the boss parts 52 of the stationary member 5 are fixed via screws, thereby securing the stationary member 5 to the storage part 30 of the mirror housing 3. The storage part 30 of the mirror housing 3 stores therein each of the vehicle mirror surface angle adjusting device 2, the mirror unit 4, and the angle detection storage unit.

The cover part 31 is attached to the back-face side of the storage part 30, and covers from the upper part to the slightly lower part of the back-face side of the storage part 30. In other words, the cover part 31 covers the opening part 32 and the fixture parts 33 in the storage part 30.

(Description of the Mirror Unit 4)

The mirror unit 4 has a mirror 41 carrying a reflecting surface 40, and a mirror holder 42 holding the mirror 41, as shown in FIG. 2. The reflecting surface 40 of the mirror 41 is represented by a mirror surface. The mirror holder 42 is attached to the mirror unit attachment part of the movable member 6. This allows the mirror unit 4 to be attached to the movable member 6. Consequently, an angle of the mirror surface 40 in the mirror unit 4 is adjusted by an action of the vehicle mirror surface angle adjusting device 2.

(Description of the Angle Detection Storage Unit)

The angle detection storage unit detects and stores a tilting angle of the mirror surface 40 in mirror unit 4. The angle detection storage unit has a sensor that detects an angle (not depicted), a memory that stores the detected angle (not depicted), and the like.

(Description of an Action of the Embodiment)

The vehicle mirror surface angle adjusting device 2 and the vehicle mirror device 1 according to the embodiment have the configuration as described above, and hereinafter description will be made for an action thereof.

Once the left-right motor of the vehicle mirror surface angle adjusting device 2 is driven, the left-right adjustable rod rotates via the left-right power transmission mechanism, and moves back and forth by screw feeding action. This causes the movable member 6 to rotate left and right about a vertical axis passing through the rotational center A, relative to the stationary member 5. Consequently, the mirror unit 4 in the proximity of the movable member 6 rotates left and right about the vertical axis passing through the rotational center A, relative to the mirror housing 3 in the proximity of the stationary member 5.

Moreover, once the up-down motor of the vehicle mirror surface angle adjusting device 2 is driven, the up-down adjustable rod rotates via the up-down power transmission mechanism, and moves back and forth by screw feeding action. This causes the movable member 6 to rotate up and down about a horizontal axis passing through the rotational center A, relative to the stationary member 5. Consequently, the mirror unit 4 in the proximity of the movable member 6 rotates up and down about the horizontal axis passing through the rotational center A, relative to the mirror housing 3 in the proximity of the stationary member 5.

In this way, an angle of the mirror surface 40 is adjusted so as to fit with an eye level of a driver or the like. Additionally, also in the status of the movable member 6 rotating up and down and left and right relative to the stationary member 5, the sealant 9 is interposed into the gap G between the stationary-side spherical surface 57 of the stationary member 5 and the movable-side spherical surface 63 of the movable member 6, and seals the gap G, as shown in FIGS. 4(B), 4(C), and 4(D). This can prevent water from passing through the gap G and penetrating inside the vehicle mirror surface angle adjusting device 2.

(Description of an Effect of the Embodiment)

The vehicle mirror surface angle adjusting device 2 and the vehicle mirror device 1 according to the embodiment have the configuration and action as described above, and hereinafter description will be made for an effect thereof.

Since the vehicle mirror surface angle adjusting device 2 and the vehicle mirror device 1 according to the embodiment have the gap G formed between the stationary-side spherical surface 57 of the stationary member 5 and the movable-side spherical surface 63 of the movable member 6, the stationary-side spherical surface 57 and the movable-side spherical surface 63 will not contact with each other. Consequently, the vehicle mirror surface angle adjusting device 2 and the vehicle mirror device 1 according to the embodiment will not have larger contact force between the stationary-side spherical surface 57 and the movable-side spherical surface 63 under low-temperature environment. In particular, the contact force described above will not become greater depending on the dimensional tolerance of a member. Thus, the vehicle mirror surface angle adjusting device 2 and the vehicle mirror device 1 according to the embodiment enables the movable-side spherical surface 63 of the movable member 6 to slide smoothly relative to the stationary-side spherical surface 57 of the stationary member 5, and allows an angle of the mirror surface 40 to be adjusted smoothly.

In the vehicle mirror surface angle adjusting device 2 and the vehicle mirror device 1 according to the embodiment, the sealant 9, which seals the gap G, is interposed between the stationary-side spherical surface 57 of the stationary member 5 and the movable-side spherical surface 63 of the movable member 6. Consequently, despite forming the gap G between the stationary-side spherical surface 57 and the movable-side spherical surface 63, the vehicle mirror surface angle adjusting device 2 and the vehicle mirror device 1 according to the embodiment can prevent water from passing through the gap G and penetrating inside the vehicle mirror surface angle adjusting device 2, by the sealant 9, which seals the gap G.

The vehicle mirror surface angle adjusting device 2 and the vehicle mirror device 1 according to the embodiment include the circumferential groove part 58 as a sealant pool part in the stationary-side spherical surface 57 of the stationary member 5, and as well include the longitudinal groove part 64 as a sealant pool part in the movable-side spherical surface 63 of the movable member 6. Consequently, the vehicle mirror surface angle adjusting device 2 and the vehicle mirror device 1 according to the embodiment can pool the sealant 9 in the circumferential groove part 58 and the longitudinal groove part 64 as sealant pool parts, and thus can prevent the sealant 9 from flowing outside from the gap G between the stationary-side spherical surface 57 and the movable-side spherical surface 63. Thus, the vehicle mirror surface angle adjusting device 2 and the vehicle mirror device 1 according to the embodiment can restrict an application amount (usage) of the sealant 9, and in return, can provide lower production cost and lighter weight.

In the vehicle mirror surface angle adjusting device 2 and the vehicle mirror device 1 according to the embodiment, the circumferential groove part 58 is disposed circumferentially centering the centerline C, which passes through the center of the stationary-side spherical surface 57 (the rotational center A) and is perpendicular to the mirror surface 40. Consequently, the vehicle mirror surface angle adjusting device 2 and the vehicle mirror device 1 according to the embodiment indicate more clearly a position to be applied with the sealant 9, by including the circumferential groove part 58. Additionally, in the vehicle mirror surface angle adjusting device 2 and the vehicle mirror device 1 according to the embodiment, in an assembly process of the vehicle mirror surface angle adjusting device 2, the stationary member 5 is set on an assembly bench with the centerline C kept vertical, thereby making the circumferential groove part 58 parallel to the assembly bench, and thus the sealant 9 will not fall down (drop off) from the circumferential groove part 58 before assembly of the movable member 6 with the stationary member 5.

In particular, the vehicle mirror surface angle adjusting device 2 and the vehicle mirror device 1 according to the embodiment have the circumferential groove parts 58 disposed as a single continuous circumference. Consequently, in the vehicle mirror surface angle adjusting device 2 and the vehicle mirror device 1 according to the embodiment, the sealant 9 can be pooled in the circumferential groove part 58 disposed as a single continuous circumference, thus allowing secure prevention of water penetration and prevention of flow-out of the sealant 9.

In the vehicle mirror surface angle adjusting device 2 and the vehicle mirror device 1 according to the embodiment, the longitudinal groove part 64 is disposed parallel to the centerline C as a center, which passes through the center of the movable-side spherical surface 63 (the rotational center A) and is perpendicular to the mirror surface 40. Consequently, in the vehicle mirror surface angle adjusting device 2 and the vehicle mirror device 1 according to the embodiment, even when a foreign substance (such as sand or dust) adheres to the sealant 9, the adherence occurs in a potion in the proximity of the mirror surface 40, i.e., close to outside, within the sealant 9 pooled in the longitudinal groove part 64, thus allowing the foreign substance to be prevented from passing through the gap G between the stationary-side spherical surface 57 and the movable-side spherical surface 63 and entering the opposite side to the mirror surface 40, i.e., inside. Thus, in the vehicle mirror surface angle adjusting device 2 and the vehicle mirror device 1 according to the embodiment, even when a foreign substance is adhered to the sealant 9, there will be no influence on smooth angle adjustment of the mirror surface 40 and preventive action to water penetration. Here, the foreign substance is not depicted.

In particular, the vehicle mirror surface angle adjusting device 2 and the vehicle mirror device 1 according to the embodiment have twelve of the longitudinal groove parts 64 disposed parallel to the centerline C, i.e., in a longitudinal direction (in a perpendicular direction), and circumferentially with equal spacing, centering the centerline C. Consequently, in the vehicle mirror surface angle adjusting device 2 and the vehicle mirror device 1 according to the embodiment, when the movable member 6 rotates relative to the stationary member 5, the twelve of the longitudinal groove part 64 follow the rotation of the movable member 6, thereby providing no influence of an action due to a foreign substance.

The vehicle mirror surface angle adjusting device 2 and the vehicle mirror device 1 according to the embodiment include the circumferential groove part 58 on the stationary-side spherical surface 57 of the stationary member 5, and include the longitudinal groove part 64 on the movable-side spherical surface 63 of the movable member 6. Consequently, the vehicle mirror surface angle adjusting device 2 and the vehicle mirror device 1 according to the embodiment can obtain a synergistic effect of the circumferential groove part 58 and the longitudinal groove part 64.

In the vehicle mirror surface angle adjusting device 2 and the vehicle mirror device 1 according to the embodiment, the circumferential groove part 58 and the longitudinal groove part 64 have no mutual intersection when an angle of the mirror surface 40 is 0° (in neutral or in initial settings, and before adjustment of an angle of the mirror surface 40). In other words, between the edge of the circumferential groove part 58 closer to the mirror surface 40 and the end of the longitudinal groove part 64 opposed to the mirror surface 40, a part E is present in which the stationary-side spherical surface 57 of the stationary member 5 and the movable-side spherical surface 63 in the movable member 6 encounter each other, as shown in FIGS. 3(A) and 3(B). Consequently, in the vehicle mirror surface angle adjusting device 2 and the vehicle mirror device 1 according to the embodiment, the movable member 6 rotates relative to the stationary member 5, leading to communication between the circumferential groove part 58 and the longitudinal groove part 64 along with a part of the movable member 6 descending relative to the stationary member 5 as shown in FIG. 4(C); thus the sealant 9, which is pooled in the circumferential groove part 58, can be supplied to and pooled in the longitudinal groove part 64. Meanwhile, the circumferential groove part 58 and the longitudinal groove part 64 are away from each other along with another part of the movable member 6 ascending relative to the stationary member 5 as shown in FIG. 4(D); thus the sealant 9, which is pooled in the circumferential groove part 58, can have a limited amount to be supplied to the longitudinal groove part 64, enabling the sealant 9 to be prevented from flowing outside via the longitudinal groove part 64.

In the vehicle mirror surface angle adjusting device 2 and the vehicle mirror device 1 according to the embodiment, the shape of the longitudinal groove part 64 is defined as a shape with a width narrower toward the mirror surface 40. Consequently, in the vehicle mirror surface angle adjusting device 2 and the vehicle mirror device 1 according to the embodiment, upon the movable member 6 descending relative to the stationary member 5, the longitudinal groove part 64 of the movable member 6 descends relative to the rim of the opening part 50 of the stationary member 5, and thus the width of the longitudinal groove part 64 gradually becomes narrow relative to the rim of the opening part 50, as shown in FIG. 4(C). This increases speed of the sealant 9, which is pooled in the longitudinal groove part 64, to ascend the longitudinal groove part 64, thus allowing a foreign substance entering the longitudinal groove part 64 (not depicted) to be discharged out from the longitudinal groove part 64 as shown with a solid arrow in FIG. 4(C).

(Description of Examples Other than the Embodiment)

Furthermore, in the embodiment described above, the circumferential groove part 58 as a sealant pool part is disposed on the stationary-side spherical surface 57 of the stationary member 5, and as well, the longitudinal groove part 64 as a sealant pool part is disposed on the movable-side spherical surface 63 of the movable member 6. However, in the invention, a sealant pool part may be disposed on at least one of the stationary-side spherical surface 57 and the movable-side spherical surface 63. For example, only the stationary-side spherical surface 57 may include the circumferential groove part 58, or only the movable-side spherical surface 63 may include the longitudinal groove part 64.

In the embodiment described above, the circumferential groove part 58 is disposed as a single continuous circumference on the stationary-side spherical surface 57 of the stationary member 5. However, in the invention, the circumferential groove part 58 may be disposed as a discontinuous circumference, or a plurality of the circumferential groove parts 58 may be disposed circumferentially. Moreover, the circumferential groove part 58 may be disposed on the movable-side spherical surface 63 of the movable member 6, or may be disposed on each of the stationary-side spherical surface 57 of stationary member 5 and the movable-side spherical surface 63 of the movable member 6. Here, in the case of the circumferential groove part 58 disposed as a discontinuous circumference, the longitudinal groove part 64 is preferably arranged between the circumferential groove part 58 and the circumferential groove part 58.

In the embodiment described above, twelve of the longitudinal groove parts 64 are disposed in a longitudinal direction (in a perpendicular direction) and circumferentially with equal spacing, on the movable-side spherical surface 63 of the movable member 6. However, in the invention, the longitudinal groove part 64 may be disposed obliquely (spirally), or may be disposed circumferentially without equal spacing, and the number is not limited. For example, the number may be one, three, or four. Furthermore, the longitudinal groove part 64 may be disposed on the stationary-side spherical surface 57 of the stationary member 5, or may be disposed on each of the stationary-side spherical surface 57 of the stationary member 5 and the movable-side spherical surface 63 of the movable member 6.

In the embodiment described above, the circumferential groove part 58 and the longitudinal groove part 64 have no mutual intersection when an angle of the mirror surface 40 is 0°. However, in the invention, the circumferential groove part 58 and the longitudinal groove part 64 may have a mutual intersection when an angle of the mirror surface 40 is 0°.

In the embodiment described above, the shape of the longitudinal groove part 64 is defined as a shape with a width narrower toward the mirror surface 40. However, in the invention, the shape of the longitudinal groove part 64 is not limited particularly. For example, the width of the longitudinal groove part 64 may continue evenly.

In the embodiment described above, the vehicle mirror device 1 is one mounted outside a vehicle body (door). However, in the invention, the vehicle mirror devices 1 include other types such as one mounted on a fender of a vehicle body (a fender mirror device), one mounted on the upper part of a rear door (a rear under mirror device), one mounted on a truck (a truck mirror device), and one mounted inside a vehicle body (an interior mirror device).

Incidentally, the invention is not limited to the embodiments described above.

DESCRIPTION OF REFERENCE NUMERALS

1 Vehicle mirror device
2 Vehicle mirror surface angle adjusting device
3 Mirror housing
30 Storage part
31 Cover part
32 Opening part
33 Fixture part
4 Mirror unit
40 Mirror surface
41 Mirror
42 Mirror holder
5 Stationary member
50 Opening part
51 Closed part
52 Boss part
53 Holding member storage part
54 Motor storage part
55 Power transmission mechanism storage part
56 Adjustable rod storage part
57 Stationary-side spherical surface
58 Circumferential groove part (sealant pool part)
6 Movable member
60 Attachment part
61 Side wall part
62 Holding member attachment part
63 Movable-side spherical surface
64 Longitudinal groove part (sealant pool part)
7 Holding member
8 Driving member
80 Motor
81 Cover
9 Sealant A Rotational center
B Back
C Centerline
D Down
E Encountering part
F Front
G Gap
R5, R6 Radius
U Up

The invention claimed is:

1. A vehicle mirror surface angle adjusting device that adjusts an angle of a mirror surface of a vehicle, the vehicle mirror surface angle adjusting device comprising:
   a stationary member fixed to a mirror housing,
   a movable member to be attached with a mirror unit,
   a holding member holding the movable member onto the stationary member and rotatably centering a rotational center, and
   a driving member allowing the movable member to rotate relative to the stationary member along with centering the rotational center,
   wherein the stationary member has a stationary-side spherical surface configured of a part of the spherical surface that centers the rotational center,
   the movable member has a movable-side spherical surface configured of a part of the spherical surface that centers the rotational center, the movable-side spherical surface having a radius smaller than a radius of the stationary-side spherical surface,
   the holding member rotatably holds the movable member onto the stationary member such that the movable-side spherical surface is out of contact with the stationary-side spherical surface so that a gap is formed between the stationary-side spherical surface and the movable-side spherical surface, and
   at least one of the stationary-side spherical surface and the movable-side spherical surface includes thereon a sealant pool part of a sealant, the sealant pool part including a circumferential groove part that is disposed continuously over an entire circumference centering a centerline which passes through the rotational center and intersects the mirror surface, and the sealant being applied seamlessly over the entire circumference of the circumferential groove part to seal the gap.

2. The vehicle mirror surface angle adjusting device according to claim 1, wherein the sealant pool part includes a longitudinal groove part disposed in the direction intersecting the mirror surface.

3. The vehicle mirror surface angle adjusting device according to claim 2, wherein the circumferential groove part and the longitudinal groove part have no mutual intersection when the mirror surface is in neutral or in initial settings.

4. The vehicle mirror surface angle adjusting device according to claim 2, wherein the longitudinal groove part has a shape with a width narrower toward the mirror surface.

5. A vehicle mirror device comprising:
   the vehicle mirror surface angle adjusting device according to claim 1,
   a mirror housing fixed with the stationary member, and
   a mirror unit attached to the movable member.

* * * * *